Figure 1:
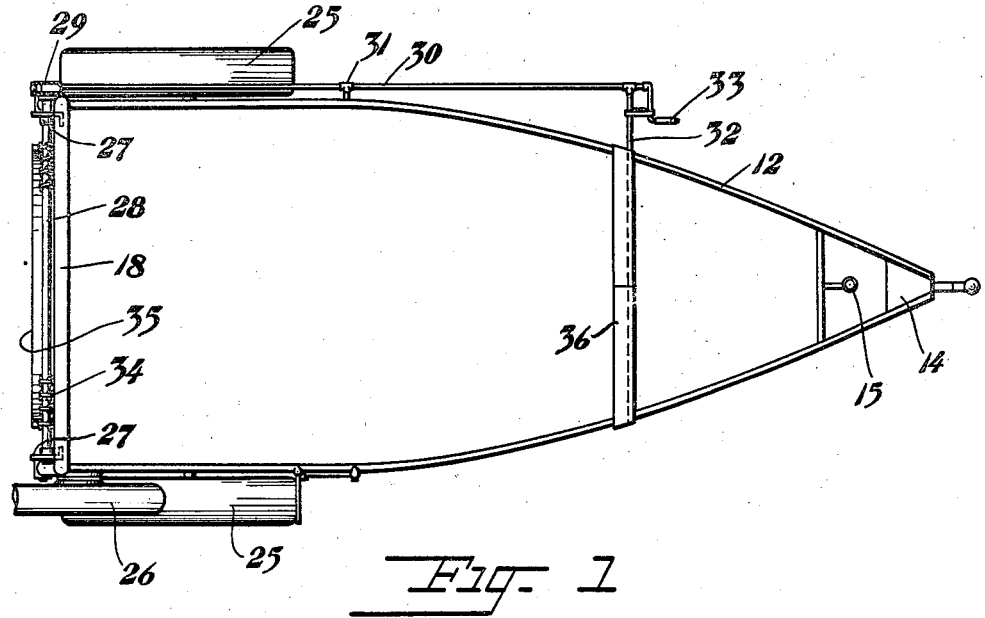

Aug. 5, 1947.  J. D. LARSON  2,425,252
BOAT TRAILER
Filed Nov. 17, 1945  2 Sheets-Sheet 1

Inventor
John D. Larson

By Clarence A. O'Brien
and Harvey B. Jacobson
Attorneys

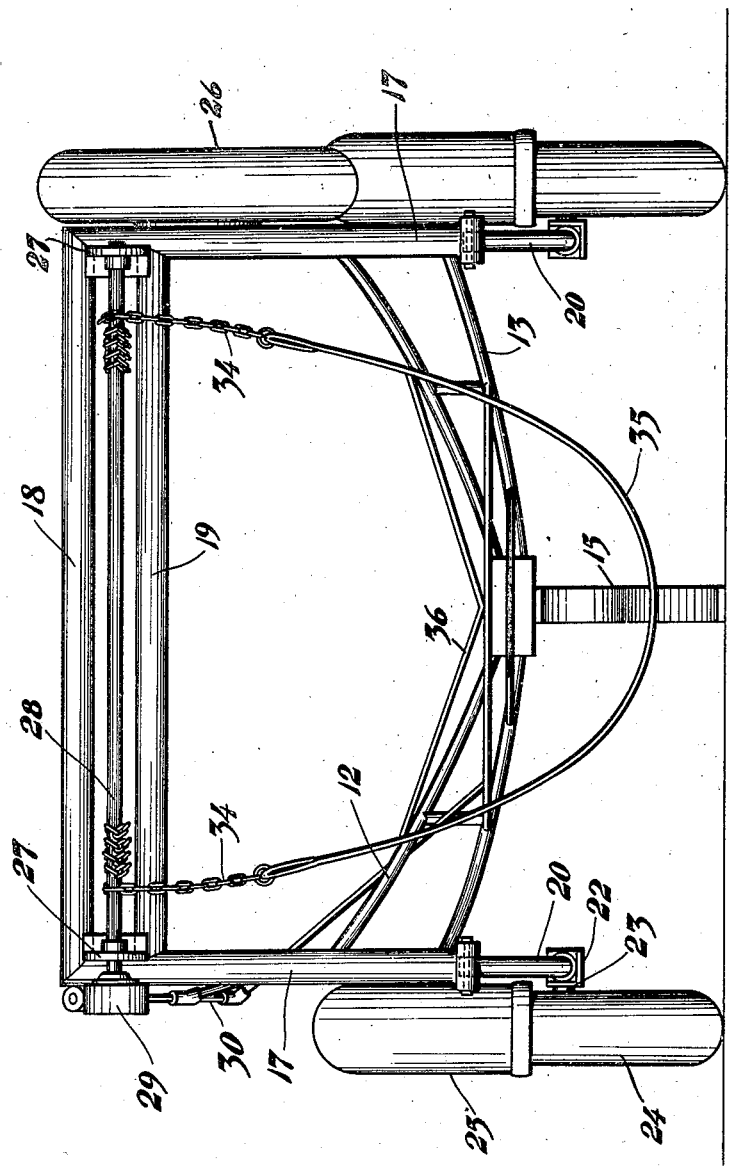

Patented Aug. 5, 1947

2,425,252

UNITED STATES PATENT OFFICE 2,425,252

BOAT TRAILER

John D. Larson, Broken Bow, Nebr.

Application November 17, 1945, Serial No. 629,244

2 Claims. (Cl. 214—65)

This invention relates to a boat trailer, and more particularly to such a device adapted to be towed by a vehicle for the land transportation of boats.

A primary object of the invention is the provision of an improved trailer adapted to support and carry a boat.

A further object of the invention is the provision of such a device characterized by improved means for positioning and supporting the boat thereon.

A still further object of the invention is the provision of such a device provided with lifting means whereby the boat may be elevated to and supported on the trailer.

Other objects will in part be obvious and in part be pointed out as the description of the invention proceeds and shown in the accompanying drawings wherein there is disclosed a preferred embodiment of this inventive concept.

Figure 2:
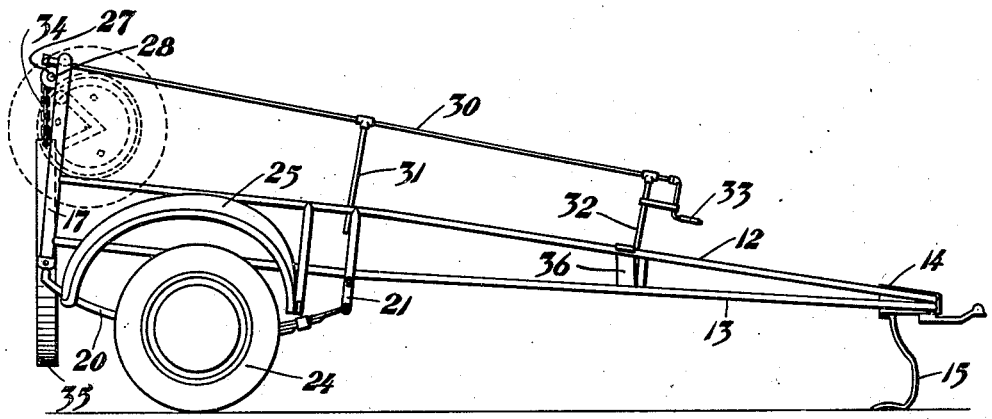

In the drawings:

Figure 1 is a top plan view of one form of trailer embodying this inventive concept, Figure 2 is a side elevational view of the device shown in Figure 1, and Figure 3 is an enlarged rear elevational view of the device disclosed in Figures 1 and 2.

Similar reference characters refer to similar parts throughout the several views of the drawings.

As best shown in Figures 1 and 2, the trailer of the instant invention is comprised of upper and lower members 12 and 13, respectively, diverging from a common plate 14, adapted to be secured in any desired manner to a towing vehicle, and supported, as by a supporting leg 15. At their rear or diverged extremities these members are rigidly secured to uprights 17 which extend above the uppermost of the member 12 and are connected across the top thereof as by bars 18 and 19. The lower extremities of the uprights 17 support, respectively, one end of springs 20, the opposite end of which is secured by a support 21 to the frame members 12 and 13. Each of the springs 20 carries a suitable axle housing 22 in which is supported a stud-axle 23, which in turn carries a freely rotatable wheel 24. Fenders 25 may be provided for the wheels if desired and secured in any suitable manner to the sides of the frame. A spare wheel 26 is adapted to be secured in any desired manner to one of the uprights 17.

Carried between the members 18 and 19 and suitably journaled for rotation in brackets 27 at the ends thereof is a shaft 28, one end of which extends into a housing 29 containing a worm and gear arrangement. A rod 30 extends from the worm gear and is supported on the frame by supporting brackets 31 and 32, and terminates in a crank 33 adapted for the rotation of the worm.

Wrapped around the axle 28 are two chains 34, the extremities of which are connected as by a depending flexible band 35, which may be comprised of heavy rubber or the like.

From the foregoing, the operation of the device should now be readily understandable. When it is desired to transport a boat, the flexible band may be passed under the boat and the trailer suitably positioned in such manner that the diverging frame members 12 and 13 pass on opposite sides of the boat. The front end of the boat may then be supported either on the plate 14 or on a suitable transverse resilient band 36, whereupon the crank 33 is rotated, which in turn rotates the axle 28 causing the belt 35 to lift the rear end of the boat from the ground, and secure the same in travelling position.

From the foregoing it will now be seen that there is herein provided a device accomplishing all of the objects of this invention, and others, including many advantages of great practical utility and commercial importance.

As many embodiments may be made of this inventive concept and as many modifications may be made in the embodiment hereinbefore shown and described, it is to be understood that all matter herein is to be interpreted merely as illustrative and not in a limiting sense.

I claim:

1. A boat trailer comprising a frame having diverging side members connected at their front end to a trailer hitch, vertical posts at the rear ends and extending above and below said side members, a pair of vertically spaced bars connecting the upper ends of said posts, stub axles and wheels carried by the lower ends of said posts, a load supporting sling extending transversely between the upper portions of said members intermediate the ends thereof, and a load supporting and lifting means carried by and at the extremities of said parallel bars, a crank operated worm and pinion drive for detaching said lifting means.

2. A boat trailer comprising a frame having diverting side members connected at their front end to a trailer hitch, vertical posts at the rear ends and extending above and below said side members, a pair of vertically spaced bars connecting the upper ends of said posts, stub axles and wheels carried by the lower ends of said posts, a load supporting sling extending transversely between the upper portions of said members intermediate the ends thereof, and a load supporting and lifting means carried by and at the extremities of said parallel bars, a crank operated worm and pinion drive for detaching said lifting means, vertical reinforcing members intermediate the ends of said side frames and having their lower ends terminating therebelow, springs mounted between the lower ends of said posts and said reinforcing members, said stub axles being carried by said springs.

JOHN D. LARSON.

REFERENCES CITED

The following references are of record in the file of this patent:

UNITED STATES PATENTS

| Number | Name | Date |
|---|---|---|
| 1,531,180 | Erickson | Mar. 24, 1925 |
| 2,260,676 | Lafaye, Sr. | Oct. 28, 1941 |
| 2,375,754 | Ballinger | May 15, 1945 |
| 2,388,870 | Sackett | Nov. 13, 1945 |